Aug. 21, 1962 E. G. ANDREWS 3,050,716

MAGNETIC STORAGE CIRCUITS

Filed Oct. 8, 1958 2 Sheets-Sheet 1

INVENTOR
E. G. ANDREWS
BY Walter M. Hill
ATTORNEY

INVENTOR
E. G. ANDREWS
BY Walter M. Hill
ATTORNEY

United States Patent Office 3,050,716
Patented Aug. 21, 1962

3,050,716
MAGNETIC STORAGE CIRCUITS
Ernest G. Andrews, Mountain Lakes, N.J., assignor to Bell Telephone Laboratories, Incorporated, New York, N.Y., a corporation of New York
Filed Oct. 8, 1958, Ser. No. 766,040
12 Claims. (Cl. 340—174)

This invention relates to magnetic storage circuits and, in particular, to such circuits in which stored information may be delivered at output terminals while either retaining the information within the circuits or replacing it with new information.

The use of magnetic devices to store information is well known in the art. In general, these devices have substantially rectangular hysteresis characteristics and are capable of being switched from one magnetic condition to another by passing currents of the appropriate polarity and amplitude through coils associated with them. Information is stored by placing a magnetic device in one or the other of its two magnetic conditions, which is often used to represent respective digits of a binary numbering system. Stored information is read out of such a device by applying a current to a read-out winding associated with it and detecting whether or not its magnetic condition changes.

When the magnetic condition of a magnetic device is changed or switched during the read-out process, the information once read out is no longer stored in the device and consequently is not available for future use. Several approaches have been made to overcome this problem. One obvious scheme is to restore the read-out information in the same device at the end of the read-out operation. This scheme has at least two disadvantages in that the information must be stored in some external means until the completion of the read-out operation and additional time must be allowed for a restoring operation. Other schemes restore the read-out information in other magnetic devices. One of the last-mentioned schemes utilizes a pair of devices for each stored piece of information and transfers the information between the devices when information is read out. The magnetic core circuit disclosed in FIG. 2 of an article entitled "Static Magnetic Storage and Delay Line," by Wang and Woo, in the January 1950 issue of The Journal of Applied Physics, is an example of this type of memory unit. Other circuits which restore read-out information in other magnetic devices are disclosed in the copending applications of C. W. Rosenthal, Serial No. 478,805, filed on December 30, 1954, which issued on January 26, 1960, as Patent No. 2,922,988, and J. H. McGuigan, Serial No. 603,010, filed on August 9, 1956, now Patent No. 3,016,521. These applications disclose matrices formed by rows and columns of magnetic cores. Each of these matrices always has at least one nonstoring core. In operation, information is read out of one or more cores and returned to immediately preceding core or cores which are always in a standby or nonstoring condition. This action causes the stored information to be precessed through the matrices in response to the sequential application of switching currents. In still other circuits, as illustrated by that disclosed in the copending application of J. H. McGuigan, Serial No. 718,-585, filed on March 3, 1958, a piece of stored information is represented by the relative conditions of two cores with both cores being switched simultaneously on read-out in order to preserve the stored information.

In addition to the ability to retain stored information in a magnetic device arrangement after reading out the information, other features are found in some of the prior art matrices. One of these features in an increased operating speed acquired by causing write-in operations to overlap read-out operations. During these overlapping operations, either the information being read out or new information may be written into the matrix. Another of these features is the ability to immediately read out any of the stored information. That is, random access to the stored information is provided as distinguished from sequential access. Although sequential access is desirable when the complete contents of a memory are periodically examined, it is time consuming when reading out a single bit of information as it generally requires reading out a plurality of stored information before reading out the desired information. Still another feature found in some of these prior art matrices is that they lend themselves to rapid construction. This last feature is achieved by coil arrangements and interconnections which permit a matrix of devices to be completely wired by automatic machinery. However, so far as applicant is aware, the prior art does not contain a matrix having all of these features, although in some matrix applications it is desirable, if not necessary, to have such a matrix.

An object of the present invention is to provide all of the above-described features in a magnetic memory arrangement.

In one of its broader aspects, the present invention takes the form of matrices in which pairs of magnetic devices are arranged in rows and columns. In the present invention, as in the first-mentioned McGuigan application, an address or drive pulse used for reading out information stored in a device is also used to initiate a write-in operation in another device and to provide a portion of the energy necessary to switch the other device. When the information to be stored in this other device requires it to be switched, additional energy is applied to it to cause it to switch. This action permits information to be rapidly read out and restored in the matrix. The present invention, however, does not cause restored information to be precessed through a matrix but instead retains it within the same pair of devices in which it was previously stored. This is accomplished by using the devices in each pair in an alternating manner so that when information is read out of one the same information is restored in the other. Because information may be restored within the same pair of devices from which it is read out, the exact location of stored information is always known and may be acquired immediately by applying the correct drive pulses. Furthermore, new information may be written into the matrix just as rapidly as previously stored information.

In matrices constructed in accordance with the present invention, each magnetic device is threaded by at least two address or drive leads. Furthermore, in accordance with one feature of the invention, both devices in each pair are threaded by the same drive leads. These leads are threaded so that address or drive pulses produce a magnetomotive force in a storing device to cause it to switch to a first magnetic condition when in its second magnetic condition, while producing a magnetomotive force in its companion device which only tends to switch it from its first magnetic or nonstoring condition to its second magnetic condition. When the second magnetic condition of the companion device represents the information to be stored, an additional magnetmotive force is produced in this device to cause it to switch to this condition. However, when the first magnetic condition represents the information to be stored, an additional force is not applied so that the device remains in this condition.

Various magnetic devices, such as magnetic cores and magnetic wires, may be used in practicing the invention. The magnetic wires may take the form of the so-called twistors disclosed, for example, in United States application Serial No. 675,522, filed on August 1, 1957, by A. H. Bobeck.

The ease with which embodiments of the present invention may be wired and other objects and features will become apparent from a study of the following detailed descriptions of several specific embodiments of the invention.

Figure 1:
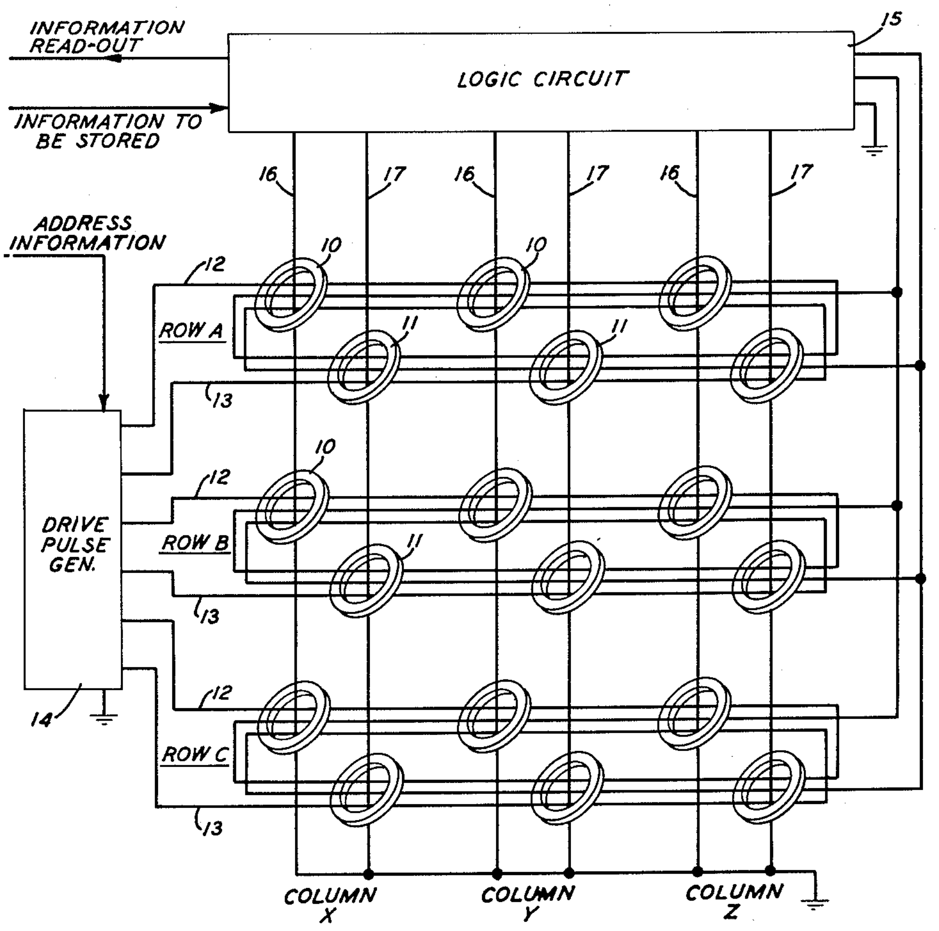
FIG. 1 is a schematic diagram of a magnetic-core word-organized matrix illustrating the principles underlying the invention.

FIG. 1 shows a schematic diagram of a magnetic core matrix illustrating the principles underlying the invention. The cores in the matrix are grouped in pairs with each pair comprising a toroidal core 10 and a toroidal core 11. In this particular embodiment binary words are stored in horizontal rows. In operation, either all of cores 10 or all of cores 11 in a row are storing information while the remaining cores in the row are in a standby or nonstoring condition. In order to facilitate the following discussion and to demonstrate the ease with which embodiments of the present invention may be constructed, all of the cores are shown tilted in the same direction at approximately 45 degrees with respect to the horizontal. The pairs of cores are arranged to form three rows A, B and C and three columns X, Y and Z. As recognized by those experienced in the art, the matrix may comprise any number of rows and columns with the minimum number being determined by the information to be stored.

A pair of address or drive leads 12 and 13 are provided for each row of core pairs. Leads 12 and 13 are connected between a drive pulse generator 14 and a logic circuit 15. Source 14 and logic circuit 15 are both connected to ground to provide a return path for currents passing through leads 12 and 13. In each row, lead 12 is threaded in a first direction through cores 10, in the opposite direction through cores 11 and again in the first direction through cores 10. Lead 13 in each row is threaded in the first direction through cores 11, in the opposite direction through cores 10 and again in the first direction through cores 11. Leads 12 are therefore threaded twice in a first polarity sence through cores 10 and once in a second polarity sense through cores 11 while leads 13 are threaded once in the second polarity sense through cores 10 and twice in the first polarity sense through cores 11.

Drive pulse generator 14 provides an address or drive pulse to only one of leads 12, 13 at a time. When a pulse is passed twice through a row of storing cores, magnetomotive forces are produced which are sufficient to switch these cores to a first magnetic condition when not already in that condition. At the same time, this pulse is passed only once in the opposite polarity sense through the non-storing cores in the same row to produce magnetomotive forces which are insufficient to cause these cores to switch from their first magnetic or standby condition to their second magnetic condition. Information is therefore read out of and, as will be seen shortly, written into the matrix on a row-by-row basis.

A pair of leads 16 and 17 are provided for each column of core pairs. Each of the leads 16 and 17 is connected between logic circuit 15 and ground. In each column, lead 16 is passed through cores 10 while lead 17 is passed through cores 11. All of these leads are passed through the cores in the same polarity sense. These leads are used alternately for sensing and write-in purposes in a manner so that when one group is performing as sensing leads, the other group is performing as write-in leads.

When reading information out of a core, its lead 16 or 17 is used as a sensing lead while lead 16 or 17 of its companion core is used as a write-in lead. The duration of the current pulses from generator 14 is equal to the read-out write-in cycle of a core pair so that, as illustrated, approximately one-half of the current necessary to switch a core during write-in is supplied by generator 14 while the remainder is supplied by logic circuit 15. Because only one of the drive leads 12, 13 is energized at a time, only the cores in its row can be switched by current pulses being applied to leads 16 or 17. Information is therefore written into the matrix on a row-by-row basis.

Figure 2:
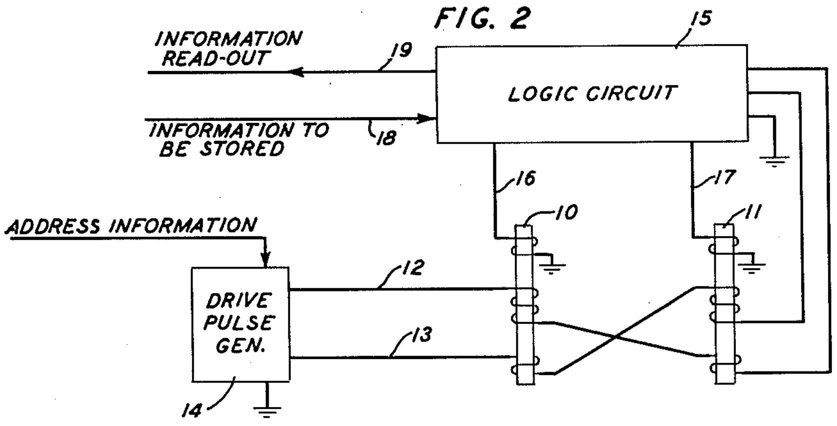
FIG. 2 is a schematic diagram of a two-core cell which further illustrates the principles underlying the invention.

A better understanding of the operation of a single core pair may be had by referring to FIG. 2 in which a schematic diagram of a two-core cell is shown. To facilitate the discussion, the cores are shown as cylindrical cores as distinguished from the toroidal type, although the same symbols have been utilized for identification purposes. As in FIG. 1, drive lead 12 has been twice threaded or wound around core 10 in a first polarity sense and once around core 11 in a second or opposite polarity sense. Likewise, drive lead 13 has been twice threaded around core 11 in the first polarity sense and once around core 10 in the opposite polarity sense. Leads 16 and 17 have been once threaded around cores 10 and 11, respectively, in the first polarity sense. The discussion with respect to the arrangement of FIG. 2 is further simplified by considering the heretofore-mentioned first and second magnetic conditions of cores 10 and 11 to be the "down" and "up" poled conditions of the cores which, in turn, represent a binary 0 and a binary 1, respectively In accordance with the convention previously established in this description, the binary 0 also represents the standby or nonstoring condition of a core. A current pulse supplied by generator 14 to lead 12 is sufficient to drive core 10 when in its 1 condition to its 0 condition, while only tending to drive core 11 from its 0 condition to its 1 condition. A current pulse through lead 13 drives core 11 when in its 1 condition to its 0 condition, while only tending to drive core 10 from its 0 condition to its 1 condition. When already in their 0 conditions, cores 10 and 11 are not changed by currents passing through their twice threaded leads. For purposes of explanation, consider core 10 to be storing and a current pulse to be applied to lead 12. When core 10 is storing a 1, it is switched to its 0 condition which induces a signal in lead 16. When it is storing a 0, the core is not switched and a signal is not induced in lead 16. This information, that is, the presence or absence of a signal in lead 16, is coupled into logic circuit 15 where it is decided whether to store a 0 or a 1 in core 11. When a 0 is to be stored in core 11, a current is not passed through lead 17 and, as the current passing through lead 12 is insufficient to switch core 11, it remains in its 0 condition. When a 1 is to be stored in core 11, a current is passed through lead 17 which produces an effect additive to that produced by the current passing through lead 12 to switch core 11 to its 1 condition. At the termination of such a read-out write-in cycle, core 10 is left in its 0 condition, which is its nonstoring or standby condition, and core 11 has either a 1 or a 0 stored in it. Similar sequences of events occur when core 11 has stored information and a current pulse is passed through lead 13.

The rapid read-out write-in action of the present invention may be appreciated from a study of FIG. 2. A finite length of time is necessary to switch a core from one of its conditions to another. When a core is switched during read-out, however, a signal appears in its lead 16 or 17 before the core has completed its switching action. This enables logic circuit 15 to make a decision and apply a current, when necessary, to lead 16 or 17 of the other core to cause the switching action in this other core to begin before the switching action in the first core is completed. The write-in operation, therefore, overlaps the read-out operation.

Drive pulse generator 14 may take various forms. The drive circuit shown, for example, in FIG. 9 of the article entitled "A Transistor-Driver Magnetic Core Memory," by E. Leroy Younker, in the March 1957 issue of the I.R.E. Transactions on Electronic Computers may be used. Because drive leads 12 and 13 of each row in embodiments of the present invention must be alternately energized, the outputs of the selection switch shown in FIG. 9 of this article should be applied alternately to leads 12 and 13 of each row. This is easily accomplished by using electronic switches, such as conventional binary counters, between the selection switch outputs and leads 12 and 13.

Logic circuit 15 may also take various forms. The read-out and write-in circuit shown in FIG. 1 of the previously mentioned Rosenthal application may be adapted for use as the basic unit in logic circuit 15. Because FIG. 1 of the present invention discloses a word-organized matrix, an adaptation of the Rosenthal circuit must be used for each column of core pairs. Furthermore, because the cores in the core pairs are used alternately for storing, conventional gating circuits activated by the drive pulses are necessary to alternate the connections between the Rosenthal circuit adaptations and their respective leads 16 and 17.

A slight modification of the embodiment of FIG. 1 may be made to ease the tolerance requirements on the drive pulses without departing from the spirit and scope of the invention. In particular, when drive leads 12 and 13 are threaded three times instead of just twice through cores 10 and 11, the tolerance requirements of the drive pulses may be relaxed while still insuring adequate magnetomotive force to switch a storing core when necessary. When the tolerances on the drive pulses are relaxed, however, the magnetomotive forces produced by them in the nonstoring cores are also affected and, if precautions are not taken, the current pulses supplied to leads 16 and 17 may not be adequate to switch nonstoring cores. This problem is circumvented by sensing the amplitudes of the drive pulses as they are coupled into logic circuit 15 and adjusting the amplitudes of the pulses applied to leads 16 and 17 so that the additional magnetomotive forces needed to switch the cores are provided. This may be accomplished through the use of a conventional current summing amplifier.

The tolerance requirements on the write-in pulses may be eased by passing a small negative bias current through drive leads 12 and 13 which do not have a drive pulse applied to them. This permits a slightly higher amplitude write-in pulse to be used without fear of switching a nonstoring core other than the one desired.

Figure 3:
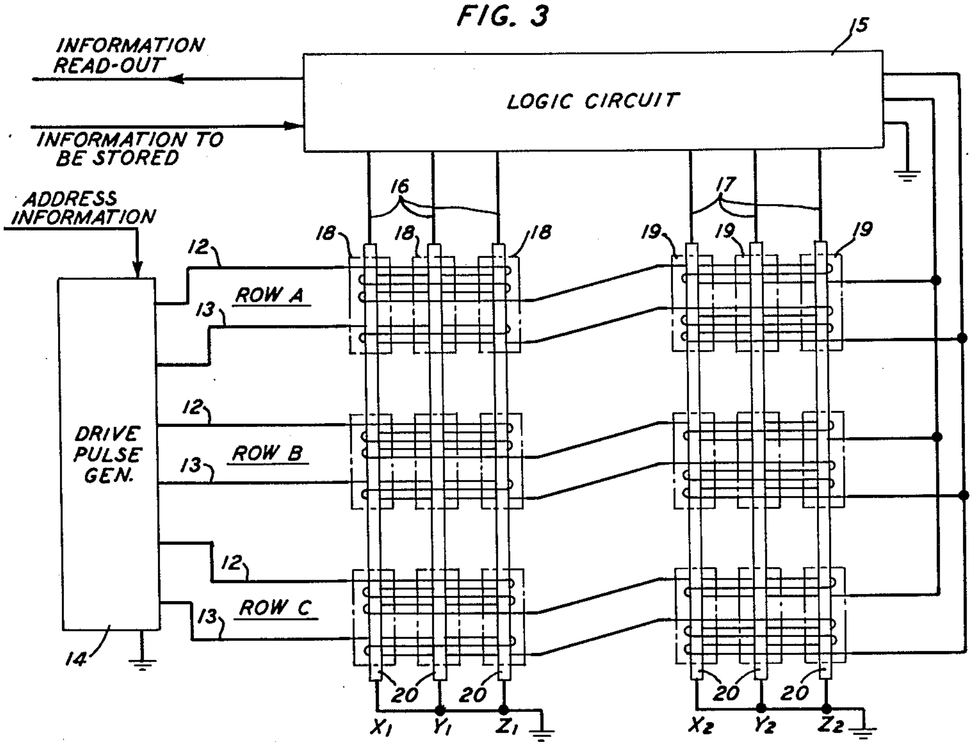
FIG. 3 is a schematic diagram of a twistor word-organized matrix constructed in accordance with the invention.

FIG. 3 is a schematic diagram of a word-organized matrix which is similar to that shown in FIG. 1. The magnetic devices utilized in this embodiment are twistors 18 and 19 instead of the previously discussed magnetic cores 10 and 11. Twistors 18 and 19 may take the form of those disclosed in the previously mentioned Bobeck application. Although these devices are fully discussed in the Bobeck application, it may be generally stated that they depend upon the coincidence of a circular and a longitudinal magnetic field to insert information into a magnetic wire. These fields produce a polarized helical magnetization. During read-out, the magnetic wire itself may be used as a sensing means since a potential difference appears between its extremities when its magnetic condition is changed. In addition to these characteristics, a number of twistors may be formed along a length of magnetic wire. The embodiments discussed herein have several twistors formed along each piece of several pieces of magnetic wire 20.

The matrix of FIG. 3 has three rows and three columns of pairs of twistors. However, to illustrate the wiring simplicity provided by the present invention, the columns of twistor pairs have been divided so that all of the first twistors in each pair are in one group and all of the remaining twistors are in another group. The halves of the columns containing the first twistors are identified by a subscript 1 while the other half columns are identified by a subscript 2. Drive leads 12 are threaded in a first and polarity sense twice around twistors 18 in their respective rows while drive leads 13 are threaded in a first polarity sense twice around twistors 19 in their respective rows. Leads 12 are also threaded in the opposite polarity sense once around twistors 19 in their respective rows while leads 13 are threaded in the opposite polarity sense once around twistors 18 in their respective rows. In other words, this is the same lead threading pattern found in the embodiment of FIG. 1. One end of each of the wires 20 is connected to ground while the other ends of wires 20 in the subscript 1 group are coupled to logic circuit 15 by respective leads 16 and the other ends of wires 20 in the subscript 2 group are coupled to logic circuit 15 by respective leads 17.

The operation of the embodiment of FIG. 3 is identical to that of FIG. 1. That is, leads 12 and 13 are individually energized for both reading out information and providing half of the energy necessary to switch a nonstoring twistor while leads 16 and 17 are alternately used for sensing read-out information and for writing in information. The twistors in each twistor pair are therefore used alternately for storing information.

While the invention has been described with respect to several specific embodiments, it will be evident to those skilled in the art that various modifications may be made without departing from the spirit and scope of the invention.

What is claimed is:

1. In a magnetic memory circuit, pairs of magnetic devices arranged in rows and columns, each of said devices having a substantially rectangular hysteresis characteristic and capable of being switched from one magnetic condition to another, first means for both selectively switching at least one of said devices to a first magnetic condition when in a second magnetic condition and only tending to switch its companion device from said first magnetic condition to said second magnetic condition, second means for sensing the switching of said devices from said second magnetic condition to said first magnetic condition, and third means for selectively producing an effect additive to that produced by said first means with respect to said companion devices to cause said companion devices to switch to said second magnetic condition.

2. Apparatus in accordance with claim 1 wherein said magnetic devices comprise magnetic wire.

3. Apparatus in accordance with claim 1 wherein said magnetic devices comprise magnetic cores.

4. In a magnetic memory circuit, pairs of magnetic devices arranged in rows and columns, each of said devices having a substantially rectangular hysteresis characteristic and capable of being switched from one magnetic condition to another, first means for both switching a first device in each pair of devices in a row to a first magnetic condition when in a second magnetic condition and only tending to switch each of the second devices in the same row from said first magnetic condition to said second magnetic condition, second means for both switching said second devices in a row to said first magnetic condition when in said second magnetic condition and only tending to switch the first devices in the same row from said first magnetic condition, third means for sensing the switching of said devices from said second magnetic condition to said first magnetic condition, and fourth means for producing an effect additive to that produced by said first and second means with respect to said second and first devices, respectively, to cause said devices to switch to said second magnetic condition.

5. Apparatus in accordance with claim 4 wherein said magnetic devices comprise magnetic wire.

6. Apparatus in accordance with claim 4 wherein said magnetic devices comprise magnetic cores.

7. In a magnetic core memory circuit, pairs of magnetic cores arranged in rows and columns, each of said cores having a substantially rectangular hysteresis characteristic and capable of being switched from one magnetic condition to another, a first lead in each row threading first cores of said pairs of cores a predetermined number of times in a first polarity sense and the remaining cores less than said predetermined number of times in the opposite polarity sense, a second lead in each row threading said first cores less than said predetermined number of times in said opposite polarity sense and the remaining cores said predetermined number of times in said first polarity sense, a third lead in each column threading said first cores, and a fourth lead in each column threading said remaining cores.

8. In a magnetic memory circuit, pairs of magnetic devices arranged in rows and columns, each of said devices having a substantially rectangular hysteresis characteristic and capable of being switched to a first magnetic condition from a second magnetic condition in response to a first predetermined magnetomotive force and to said second magnetic condition from said first magnetic condition in response to a second predetermined magnetomotive force, means for producing first and second current pulses, a first conductive means in each of said rows for producing in cooperation with said first current pulse a magnetomotive force at least equal to said first predetermined magnetomotive force in a first device of each pair of devices in a row and a magnetomotive force less than said second predetermined magnetomotive force in the remaining devices in the same row, a second conductive means in each of said rows for producing in cooperation with said second current pulse a magnetomotive force at least equal to said first predetermined magnetomotive force in said remaining devices in a row and a magnetomotive force less than said second magnetomotive force in said first devices in the same row, means for sensing the switching of said devices to said first magnetic condition from said second magnetic condition, and means for selectively producing a magnetomotive force additive to said magnetomotive force less than said second predetermined magnetomotive force in said devices to render the magnetomotive force in said devices at least equal to said second predetermined magnetomotive force.

9. In a magnetic memory circuit, pairs of magnetic cores arranged in rows and columns, each of said cores having a substantially rectangular hysteresis characteristic and capable of being switched to a first magnetic condition from a second magnetic condition in response to a first predetermined magnetomotive force and to said second magnetic condition from said first magnetic condition in response to a second predetermined magnetomotive force, means for producing first and second current pulses, a first conductive means in each of said rows for producing in cooperation with said first current pulse a magnetomotive force at least equal to said first predetermined magnetomotive force in a first core of each pair of cores in a row and a magnetomotive force less than said second predetermined magnetomotive force in the remaining cores in the same row, a second conductive means in each of said rows for producing in cooperation with said second current pulse a magnetomotive force at least equal to said first predetermined magnetomotive force in said remaining cores in a row and a magnetomotive force less than said second magnetomotive force in said first cores in the same row, means responsive to said first and second pulses and the switching of said cores to said first magnetic condition from said second magnetic condition for producing a third current pulse, and third and fourth conductive means in each column for producing in cooperation with said third current pulse a magnetomotive force additive to said magnetomotive force less said second predetermined magnetomotive force in said first and second cores, respectively, to render the magnetomotive force in said cores at least equal to said second predetermined magnetomotive force.

10. In a magnetic memory circuit, first and second magnetic devices each having a substantially rectangular hysteresis characteristic and capable of being switched to a first magnetic condition from a second magnetic condition in response to a first predetermined magnetomotive force and to said second magnetic condition from said first magnetic condition in response to a second predetermined magnetomotive force, means for producing first and second current pulses, a first conductive means for producing in cooperation with said first current pulse a magnetomotive force at least equal to said first predetermined magnetomotive force in said first device and a magnetomotive force less than said second predetermined magnetomotive force in said second device, a second conductive means for producing in cooperation with said second current pulse a magnetomotive force at least equal to said first predetermined magnetomotive force in said second device and a magnetomotive force less than said second magnetomotive force in said first device, means for sensing the switching of said devices to said first magnetic condition from said second magnetic condition, and means for selectively producing a magnetomotive force additive to said magnetomotive force less than said second predetermined magnetomotive force in said devices to render the magnetomotive force in said devices at least equal to said second predetermined magnetomotive force.

11. Apparatus in accordance with claim 10 wherein said devices comprise magnetic wires.

12. In a magnetic memory circuit, first and second magnetic cores each having a substantially rectangular hysteresis characteristic and capable of being switched to a first magnetic condition from a second magnetic condition in response to a first predetermined magnetomotive force and to said second magnetic condition from said first magnetic condition in response to a second predetermined magnetomotive force, means for producing first and second current pulses, a first conductive means for producing in cooperation with said first current pulse a magnetomotive force at least equal to said first predetermined magnetomotive force in said first core and a magnetomotive force less than said second predetermined magnetomotive force in said second core, a second conductive means for producing in cooperation with said second current pulse a magnetomotive force at least equal to said first predetermined magnetomotive force in said second core and a magnetomotive force less than said second magnetomotive force in said first core, means responsive to said first and second pulses and the switching of said cores to said first magnetic condition from said second magnetic condition for producing a third current pulse, third and fourth conductive means in each column for producing in cooperation with said third current pulse a magnetomotive force additive to said magnetomotive force less than said second predetermined magnetomotive force in said first and second cores, respectively, to render the magnetomotive force in said cores at least equal to said second predetermined magnetomotive force.

References Cited in the file of this patent

UNITED STATES PATENTS

| | | |
|---|---|---|
| 2,802,203 | Williams | Aug. 6, 1957 |
| 3,016,521 | McGuigan | Jan. 9, 1962 |